United States Patent [19]

Nakamura

[11] Patent Number: 5,394,261
[45] Date of Patent: Feb. 28, 1995

[54] OPTICAL COMMUNICATION SYSTEM AND TRANSMITTING APPARATUS FOR USE THEREIN

[75] Inventor: Kenji Nakamura, Hadano, Japan

[73] Assignee: Canon Kabushiki Kaisha, Tokyo, Japan

[21] Appl. No.: 155,160

[22] Filed: Nov. 19, 1993

Related U.S. Application Data

[63] Continuation of Ser. No. 765,011, Sep. 24, 1991, abandoned.

[30] Foreign Application Priority Data

Sep. 25, 1990 [JP] Japan ................................. 2-254695

[51] Int. Cl.6 ...................... H04J 14/00; H04B 10/04
[52] U.S. Cl. ................................... 359/180; 359/115; 359/181; 359/188
[58] Field of Search ................. 359/113, 114, 115, 118, 359/124, 125, 126, 154, 157, 180, 173, 181, 188; 385/24

[56] References Cited

U.S. PATENT DOCUMENTS

| | | | |
|---|---|---|---|
| 3,614,659 | 5/1969 | Rigrod | 372/19 |
| 3,752,992 | 5/1969 | Fluhr | 359/156 |
| 4,658,374 | 4/1987 | Cheng et al. | 359/126 |
| 4,671,604 | 6/1987 | Soref | 359/157 |
| 4,677,618 | 6/1987 | Haas et al. | 359/124 |
| 4,705,350 | 11/1987 | Cheng | 385/24 |
| 4,813,048 | 3/1989 | Yamane et al. | 372/38 |
| 5,086,349 | 2/1992 | Okayama et al. | 359/124 |
| 5,126,870 | 6/1992 | Murphy et al. | 359/124 |

FOREIGN PATENT DOCUMENTS

| | | |
|---|---|---|
| 56-94862 | 7/1981 | Japan . |
| 57-37941 | 3/1982 | Japan . |
| 2003600 | 3/1979 | United Kingdom . |
| WO9110297 | 7/1991 | WIPO . |

Primary Examiner—Richard E. Chilcot, Jr.
Assistant Examiner—R. Bacares
Attorney, Agent, or Firm—Fitzpatrick, Cella, Harper & Scinto

[57] ABSTRACT

In an optical communication system, there are provided an optical transmission path, a terminal, and a transmitter. The transmitter includes at least one light source, a plurality of external light modulators for modulating respective lights from the at least one light source according to a signal from the terminal, and a coupler means for combining modulated lights from the external light modulators into a single light to transmit this single light to the optical transmission path. As a result, the present invention can preferably be applied to a multi-value digital optical communication system, and therein a complicated modulation control device is unnecessary for obtaining a signal light intensity accurately modulated in a multi-valued form.

9 Claims, 5 Drawing Sheets

| 4-VALUED SIGNAL | MOD 1 | MOD 2 | MOD 3 |
|---|---|---|---|
| 0 | OFF | OFF | OFF |
| 1 | OFF | OFF | ON |
| 2 | OFF | ON | ON |
| 3 | ON | ON | ON |

| 5-VALUED SIGNAL | MOD 1 | MOD 2 | MOD 3 | MOD 4 |
|---|---|---|---|---|
| 0 | OFF | OFF | OFF | OFF |
| 1 | OFF | OFF | OFF | ON |
| 2 | OFF | OFF | ON | ON |
| 3 | OFF | ON | ON | ON |
| 4 | ON | ON | ON | ON |

FIG. 5

OPTICAL COMMUNICATION SYSTEM AND TRANSMITTING APPARATUS FOR USE THEREIN

This application is a continuation of application Ser. No. 07/765,011, filed Sep. 24, 1991, now abandoned.

BACKGROUND OF THE INVENTION

1. Field of the Invention

The present invention relates to an optical communication system and a transmission apparatus for use therein, and, more particularly, to an optical communication system suitable for multi-value optical communication in which signal is transmitted by modulating the intensity of light according to a multi-value digital signal and a transmitting apparatus for use in this system.

2. Related Background Art

In recent years, the speed of optical data transmission has become faster, and at the same time the capacity of data transmission has become greater. To achieve these goals, there have been developed, e.g., a high-speed system wherein a signal is transmitted at a higher bit rate, a wavelength division multiplexing system wherein optical signals having different wavelengths are transmitted through a common optical transmission path, and so forth.

Among these developments, a multi-value digital communication system is effective as a method for increasing the capacity of a communication system, compared with a conventional binary digital communication system, as the former can transmit more data than the latter in a communication system having the same bit rate.

In an optical communication system, two kinds of intensity-modulation methods are usually used for modulating light according to a transmission signal, i.e., direct modulation and external modulation.

In direct modulation, a current injected into a semiconductor laser, which is generally used as a light source in the optical communication systems, is controlled to modulate its intensity of light emission. In the external modulation method, a constant current is injected into a semiconductor laser to cause the laser to radiate a beam of a constant intensity, and the intensity of this output from the semiconductor laser is modulated by an external modulator. Samples of the external include a deflection-type light modulator in which the modulation is done by deflecting a laser light using the acousto-optic effect or electro-optic effect, an absorption-type light modulator in which the modulation is conducted by utilizing a wavelength-dependency of light absorption in semiconductors, and an interference-type light modulator in which the modulation is performed by dividing a laser light into two light beams, shifting the phase of one light beam and then combining the two light beams to cause interference between them.

However, where the intensity of an optical signal is modulated in, for example, a multi-value digital optical communication system, the following problems occur.

While the injection current into a semiconductor laser is controlled to perform the optical modulation, as discussed above, where the radiation intensity of a semiconductor laser is to be directly modulated, the relationship between a current injected into a semiconductor laser and its radiation intensity is generally non-linear. Therefore, a sophisticated control of an injection current is required according to the value of a multi-valued transmission signal, and hence a complicated current control circuit is needed. Further, since automatic power control (APC) which is usually preferred cannot be performed in the direct modulation method, the intensity of light radiation will change even for the same amount of an injection current owing to the change of a semiconductor laser with aging. Moreover, when a semiconductor laser is directly modulated, the wavelength of light radiation thereof fluctuates due to the phenomenon called chirping. As a result, there is also a problem that the multiplexing cannot be done with multiple wavelengths being close to one another too much.

In the external modulation method, where the deflection-type light modulation is carried out using the acousto-optic effect or the like, it is difficult to attain a multi-value communication because light modulation due to the control of a deflection angle can only be performed between "deflection" and "non-deflection" or "ON" and "OFF". Further, when the ratio of an amount of deflected light is to be controlled, it is necessary to accurately control, according to the value of a multi-valued signal, the electric power of a radio frequency signal to be applied to an acousto-optic device. As a result, a sophisticated circuit is also needed in this case.

Moreover, when the absorption-type or the interference-type light modulator is used, the amount of light modulation does not change linearly for the amount of a control current or a control voltage, and hence a complicated control is required. In addition thereto, the amount of a control current and the value of a control voltage need to be set or adjusted beforehand. Further, when the relationship between the control current or voltage and the modulation amount varies owing to the change with age, the amount of a transmission light corresponding to each value of a multi-valued signal will change accordingly. As a result, there occurs a problem that the error rate at the time of a signal transmission deteriorates.

SUMMARY OF THE INVENTION

An object of the present invention is to provide an optical communication system which adopts a modulation method suitable, particularly, for a multi-value optical communication system.

Another object of the present invention is to provide a transmitting apparatus which is preferably used in a multi-value optical communication system.

According to one aspect of the present invention, an optical communication system comprises an optical transmission path, a terminal, and a transmitter. The transmitter includes at least one light source, a plurality of external light modulators for modulating respective lights from the light source according to a signal from the terminal, and means for combining modulated lights from the external light modulators into a single light to transmit this single light to the optical transmission path.

According to another aspect of the present invention, a transmitter comprises at least one light source, a plurality of external light modulators for modulating lights from the light source, respectively, and means for combining modulated lights from the external light modulators into a single light.

According to still another aspect of the present invention, a signal converting method comprises the steps of providing a plurality of lights, modulating the plurality of lights according to a signal to be converted, respectively, and combining the modulated lights into a single light.

These advantages and others will be more readily understood in connection with the following detailed description of the preferred embodiment in conjunction with the drawings.

DESCRIPTION OF THE PREFERRED EMBODIMENT

Figure 1:
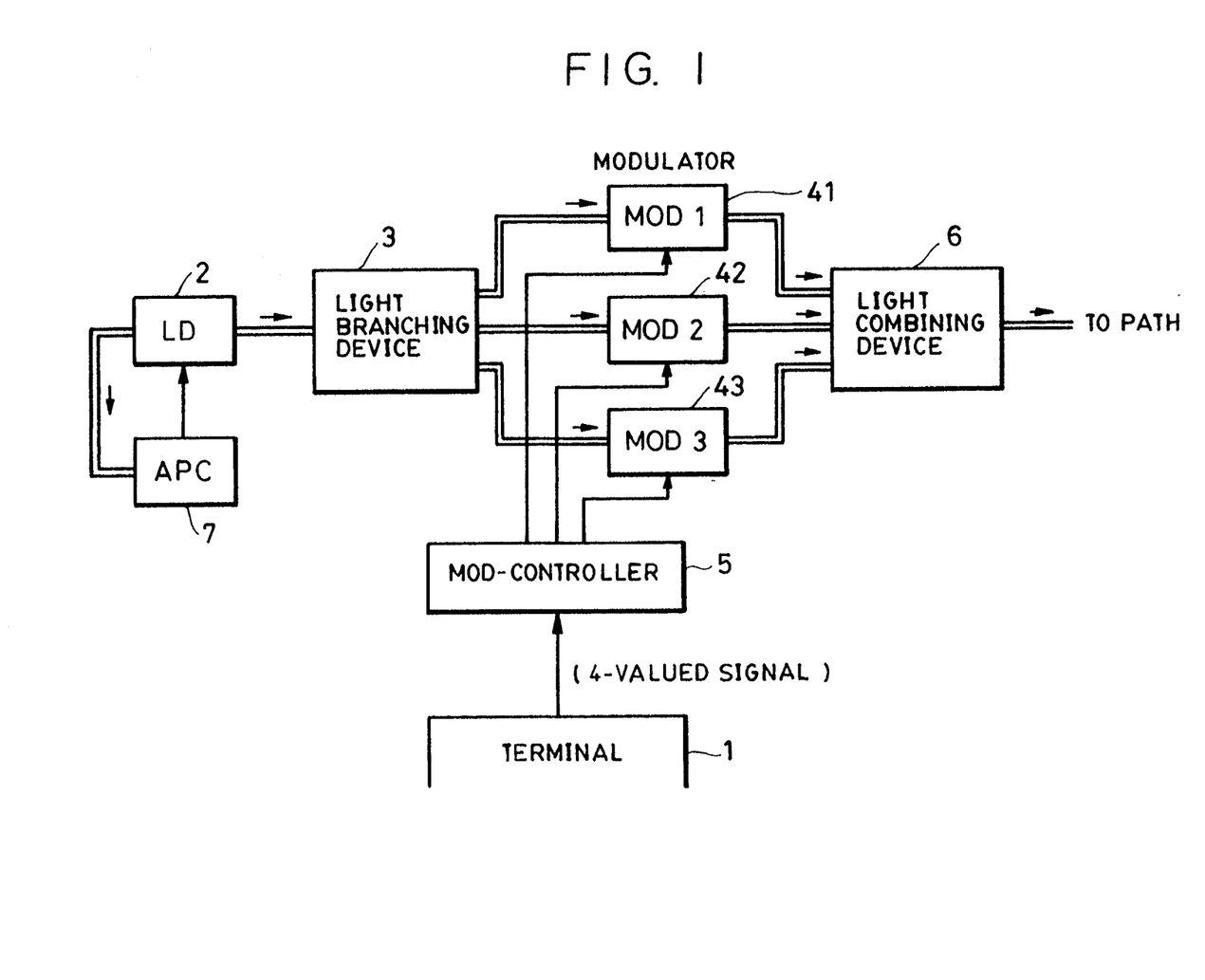
FIG. 1 is a view showing the schematic structure of a first embodiment according to the present invention.

Referring first to FIG. 1 showing the first embodiment of this invention, there are provided a transmission terminal 1 for transmitting a four-valued signal, a semiconductor laser 2 which acts as a light source, an light branching device 3 for branching light from the semiconductor laser 2 into three, external light modulators 41, 42 and 43 for respectively switching the lights from the light branching device 3 between "ON" and "OFF" (binary codes), a modulation-controlling device 5 for respectively controlling the operative conditions of the modulators 41, 42 and 43 according to the value of the four-valued signal from the terminal 1, a light combining device 6 for combining lights from the modulators 41, 42 and 43 into a single light to transmit the single light to an optical transmission path, and an automatic power control (APC) circuit 7 for controlling the semiconductor laser 2 so that the laser 2 always emits light at a contant level, by monitoring the radiation amount of the semiconductor laser 2. In FIG. 1, for ready comprehension, portions where an electric signal is transmitted are indicated by a solid line together with an arrow for indicating a transmission direction and portions where an optical signal is transmitted are indicated a solid double-line together with an arrow for indicating an optical transmission direction.

When the transmission terminal 1 is in a transmission state, the semiconductor laser 2 emits light in a steady state, and the intensity of its radiation is controlled by the APC circuit 7 so as to be maintained constant. On the other hand, the output light from the semiconductor laser 2 is branched into three lights in an equal ratio by the light branching device 3, and they are input into the external light modulators 41, 42 and 43, respectively.

Figure 2:
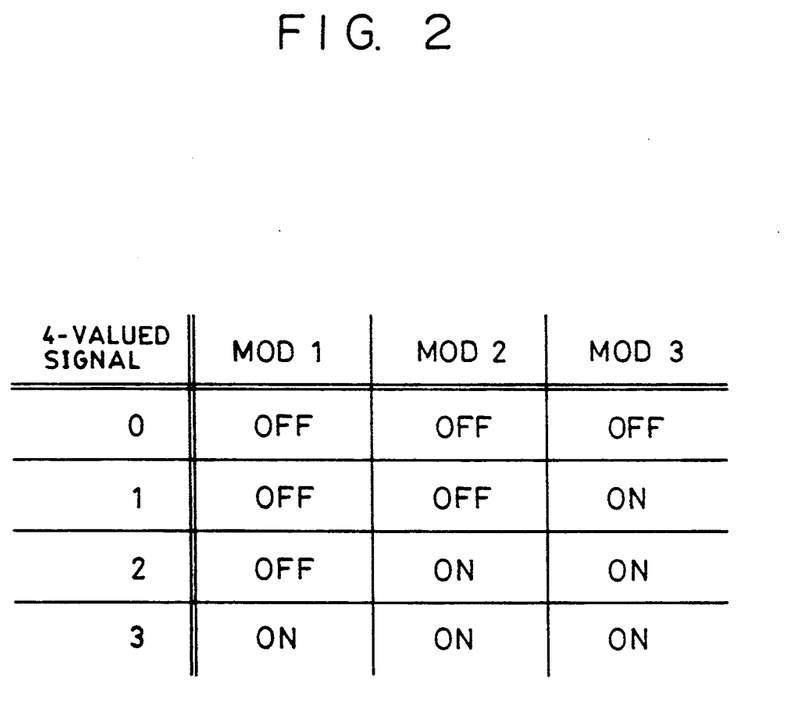
FIG. 2 is a representation illustrating the relationship between operative conditions of light modulators shown in FIG. 1 and a four-valued signal.

The transmission terminal 1 converts information to be transmitted to one of a four-valued signal consisting of four values (0, 1, 2, 3), and outputs this signal to the modulation-controlling device 5. The modulation-controlling device 5 controls the modulators 41, 42 and 43 according to the value of the four-valued signal, as shown in FIG. 2. Namely, the modulators 41, 42 and 43 are respectively switched to the "ON" state or the "OFF" state selectively. When the modulator 41, 42 or 43 is in the "ON" state, the light input to the modulator 41, 42 or 43 from the light branching device 3 is transmitted therethrough to be supplied to the light branching device 6. When the modulator 41, 42 or 43 is in the "OFF" state, the light does not pass therethrough. Therefore, provided that tile light loss and irregularities at each part in FIG. 1 are negligible (this assumption is reasonable in this case), an optical signal downstream of the light combining device 6 accurately has the intensity which is 0/3, ⅓, ⅔ or 3/3 as much as the intensity of an output from the semiconductor laser 2, depending on of the four-valued signal output from the transmission terminal 1. This intensity of the optical signal downstream of the light combining device 6 does not fluctuate since the intensity of the output from the semiconductor laser 2 is maintained unchanged by the APC circuit 7.

The modulators 41, 42 and 43 have only to perform the switching operation (ON/OFF operation), so that there is no need to conduct a sophisticated control of the amount of modulation. Further, any of the above-discussed deflection-type, absorption-type and interference-type tight modulators and so forth can preferably be used.

In the first embodiment, a signal consisting of four values is transmitted, so that twice the capacity of data can be transmitted at the same bit rate, compared with a conventional digital communication system using a two-valued (binary) signal consisting of "0" and "1".

Figure 3:
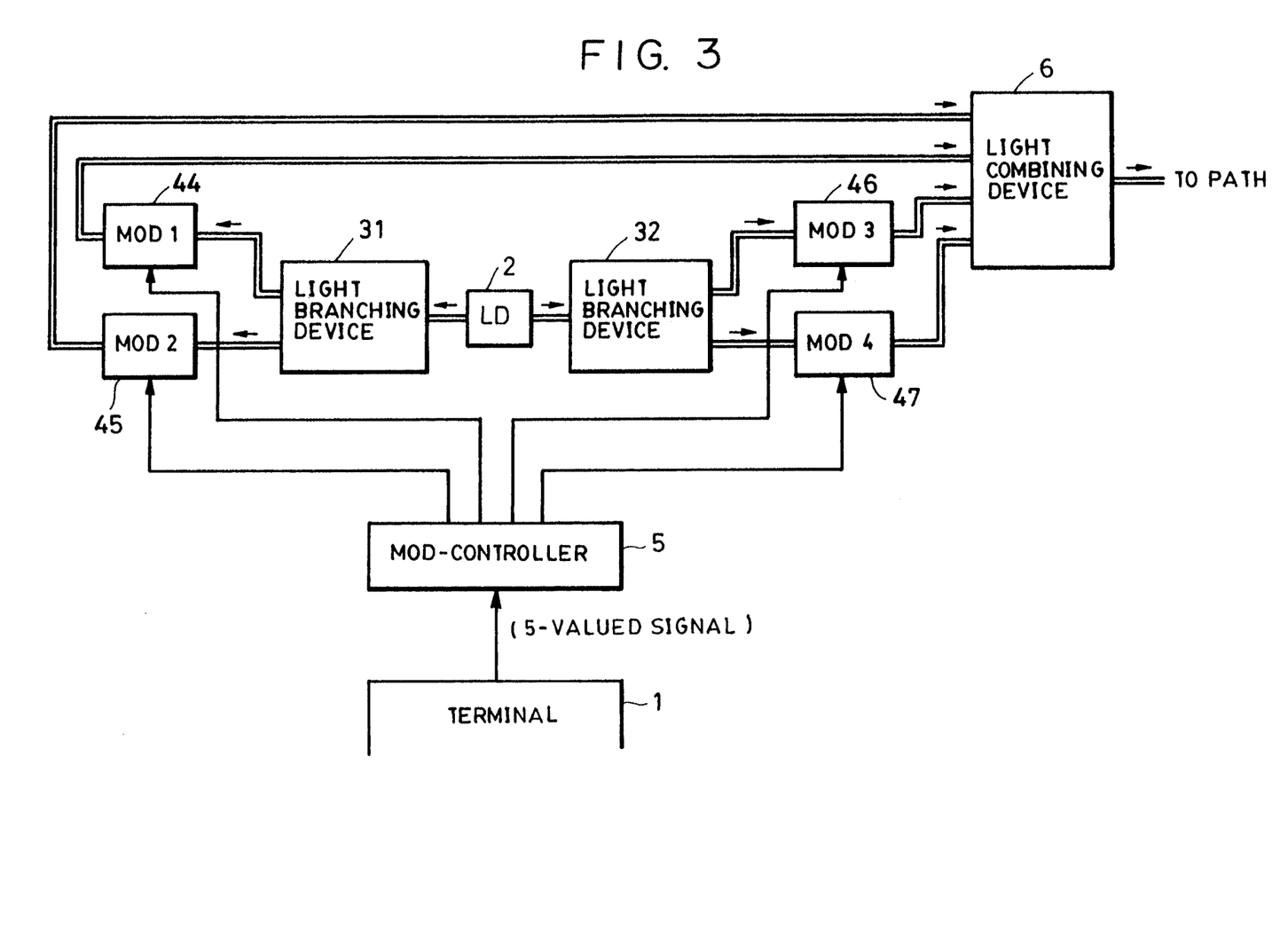
FIG. 3 is a view showing the schematic structure of a second embodiment according to the present invention.
Figure 4:
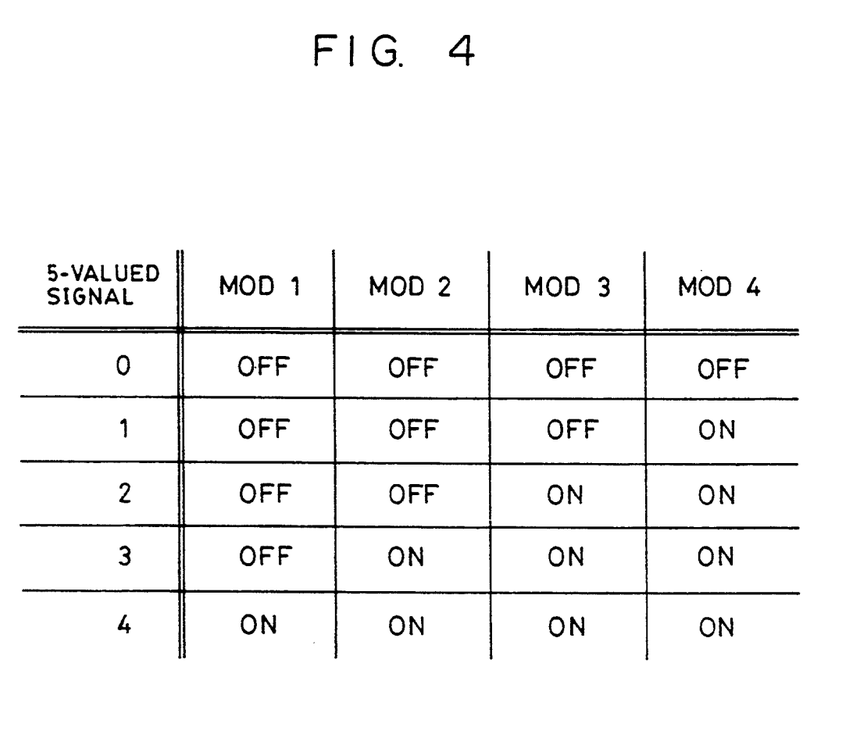
FIG. 4 is a representation illustrating the relationship between operative conditions of light modulators shown in FIG. 3 and a five-valued signal.

Turning now to FIGS. 3 and 4 showing the second embodiment, FIG. 3 shows its schematic structure and FIG. 4 shows the operative conditions of modulators corresponding to a multi-valued signal. In FIG. 3, there are illustrated two light branching devices 31 and 32 for respectively branching lights from both sides of the semiconductor laser 2, and four external light modulators 44, 45, 46 and 47. The same reference numerals as those in FIG. 1 designate the same elements or means as those shown in FIG. 1.

Figure 5:
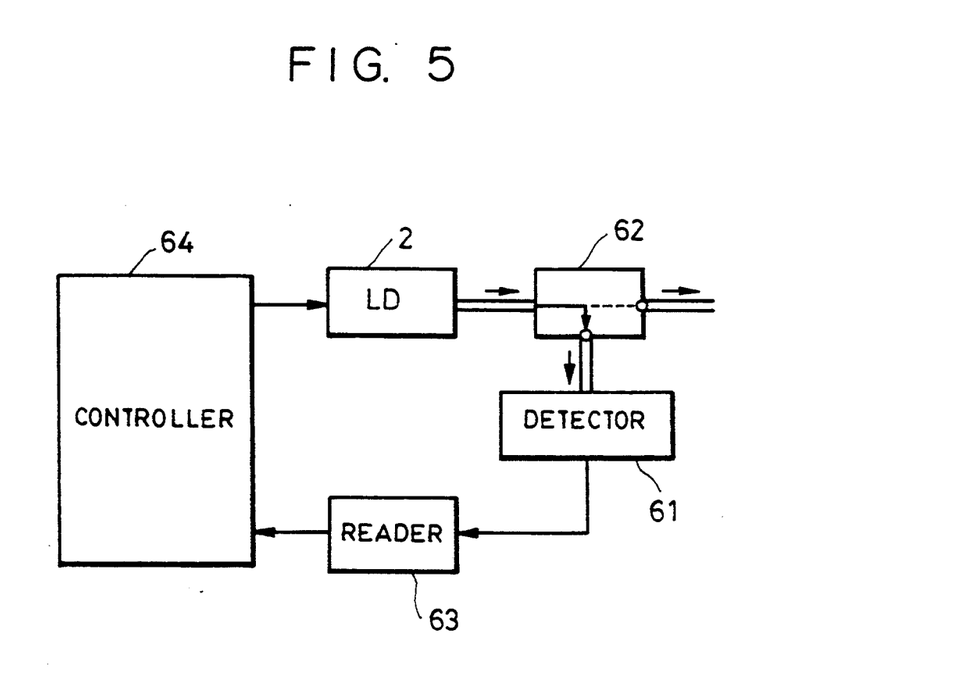
FIG. 5 is a view showing the schematic structure of a variation of the FIG. 3 embodiment.

While the output intensity of the semiconductor laser 2 is controlled by the APC circuit 7 so as to be maintained constant in the first embodiment, the APC circuit 7 can be omitted in the second embodiment, where the time required for one transmission is not as long and the output intensity of the semiconductor laser 2 can be calibrated when necessary. In other words, before the transmission, the light from the semiconductor laser 2 is switched to a detector 61 by a switch 62, and the intensity of this output light is read by an output reader 63, as shown in FIG. 5. A controller 64 obtains, from an injection current into the semiconductor laser 2 and the output light read by the reader 63, the relationship therebetween, and then the semi conductor laser 2 is driven for transmission, based on the thus obtained relationship. In this case, the time between the calibration and the start of transmission is very short, so that the change in the output intensity of the semiconductor laser 2 for the same injection current is negligible.

The semiconductor laser 2 generally outputs lights of substantially the same intensity from both sides of its resonator, and the second embodiment utilizes these output lights for transmission.

In the second embodiment, lights output from the both sides of the semiconductor laser 2 are respectively branched into two by the light branching evices 31 and 32, resulting in four signals which are input into the light modulators 44, 45, 46 and 47, respectively. The modulation-controlling device 5 controls the modulators 44–47 according to the value (0, 1, 2, 3 or 4) of a five-valued signal output from the transmission terminal 1 in such a manner that the modulators 44-47 are respectively switched between the "ON" state and the "OFF" state, as illustrated in FIG. 4. The four lights output from modulators 44, 45, 46 and 47 are combined into a single light by the light combining device 6 to be transmitted to an optical transmission path.

In the second embodiment, about half of the light from the laser 2 which is usually abandoned or used for the APC control is effectively utilized, so that the intensity of the transmission light can be increased. As a result, a signal can be transmitted to a longer-distance end.

While, in the above-discussed embodiments, a light source is referred to as a semiconductor laser, and a modulator is referred to as a deflection-type, an absorption-type, or an interference-type modulator, different components may be used so long as the former emits light stably and the latter modulates light to what can be combined with others. For example, as a light source, a light emitting diode (LED) can preferably be used for emitting a non-coherent light.

Further, the present invention can be applied to other multi-valued signals than four-valued and five-valued signals.

Further, as regards the operative conditions of external light modulators, other combinations than those illustrated in FIGS. 2 and 4 are possible. For example, in FIG. 2 it is possible that only the modulator 1 or 2 is switched to the "ON" state for the value 1 of a four-valued signal.

As has been explained above, in the present invention a transmission system is adopted in which a plurality of lights from at least one light source are respectively modulated by external modulators and thereafter the modulated lights are combined into a single light. As a result, the present invention can preferably be applied to a multi-value digital optical communication system. For example, if the number of lights from the light source is set to one less than the number of multiple values, and after these lights have respectively been switched between "ON" and "OFF", the switched lights are combined into a single light to be transmitted. Therefore, a complicated modulation control device is unnecessary for obtaining a signal light intensity accurately modulated in a multi-valued form. Further, it becomes easy to prevent the fluctuation of a signal light intensity due to changes of a light source and the like with aging.

Moreover, the fluctuation in radiation wavelength due to chirping can be avoided because of the use of external modulation, so that this invention can preferably be applied to a wavelength division multiplexing system in which mutiple wavelengths are used for transmission with the wavelengths being very close to one another. Thus, the capacity of a communication system can effectively be enhanced.

While there has been shown and described what are considered preferred embodiments of the present inventions, it will be obvious to those skilled in the art that various changes and modifications may be made therein without departing from the invention as defined by the claims.

What is claimed is:

1. An optical communication system comprising:
  an optical transmission path;
  a terminal for outputting a multi-valued digital signal; and
  a transmitter, said transmitter including a light source for emitting a light, branching means for branching the light emitted from the light source into a plurality of branched lights having common wavelength components, a generating means for generating a plurality of binary digital signals according to said multi-valued digital signal output from said terminal, a plurality of external light modulators for respectively intensity modulating the plurality of branched lights output from said branching means according to said plurality of binary digital signals generated by said generating means, combining means for combining the intensity modulated lights output from the light modulators into a single light, and transmitting means for transmitting the single light to the optical transmission path.

2. An optical communication system according to claim 1, wherein said light source comprises a laser having a resonator, and wherein lights emitted from both sides of the resonator of said laser are modulated by said external light modulators, respectively.

3. An optical communication system according to claim 2, wherein the lights emitted from both sides of the resonator of said laser are respectively branched into plural lights.

4. An optical communication system according to claim 1, wherein said light source is a laser, and wherein said transmitter further includes an automatic power control means for controlling said laser to emit light at a constant level.

5. An optical communication system according to claim 1, wherein the number of said external light modulators is one less than the number of possible values of the multi-valued digital signal, and said external light modulators respectively switch the lights emitted from said light source between "ON" and "OFF".

6. A transmitter comprising:
  a light source for emitting light;
  branching means for branching the light emitted from the light source into a plurality of branched lights having common wavelength components, a generating means for generating a plurality of binary digital signals according to a multi-valued digital signal;
  a plurality of external light modulators for respectively intensity modulating the plurality of branched lights output from said branching means according to said plurality of binary digital signals generated by said generating means; and
  combining means for combining the intensity modulated lights output from the light modulators into a single light.

7. A transmitter according to claim 6, wherein the number of said external light modulators is a number which is one less than the number of multiple values of a multi-valued digital signal to be transmitted and said external light modulators respectively switch the lights emitted from said light source between "ON" and "OFF".

8. A signal converting apparatus comprising:
  a light source for emitting light;
  receiving means for receiving a signal to be converted;
  branching means for branching the light emitted from the light source into a plurality of branched lights having common wavelength components;

generating means for generating a plurality of binary digital signals according to a multi-valued digital signal;

a plurality of external light modulators for respectively intensity modulating the plurality of branched lights output from said branching means according to the plurality of binary digital signals generated by said generating means; and combining means for combining the intensity modulated lights output from the light modulators into a single light.

9. A signal converting method comprising the steps of:

emitting a light from a light source;

branching the light emitted from the light source into a plurality of branched lights having common wavelength components;

generating a plurality of binary digital signals according to a multi-valued digital signal;

respectively intensity modulating the plurality of branched lights according to the plurality of binary digital signals generated by said generating means; and combining the intensity modulated lights into a single light.

* * * * *

UNITED STATES PATENT AND TRADEMARK OFFICE
CERTIFICATE OF CORRECTION

PATENT NO. : 5,394,261
DATED : February 28, 1995
INVENTOR(S) : Nakamura

It is certified that error appears in the above-indentified patent and that said Letters Patent is hereby corrected as shown below:

On the title page, item

[56] References Cited

U.S. PATENT DOCUMENTS

```
"3,614,659   5/1969    Rigrod
 3,752,992   5/1969    Fluhr"  should read
--3,614,659  10/1971   Rigrod
 3,752,992   8/1973    Fluhr--.
```

COLUMN 3:

Line 29, "an" should read --a--; and
Line 48, "indicated" should read --indicated by--.

COLUMN 4:

Line 5, "tile" should read --the--;
Line 52, "semi conductor" should read --semiconductor--; and
Line 64, "evices" should read --devices--.

Signed and Sealed this

Twenty-seventh Day of June, 1995

Attest:

BRUCE LEHMAN

*Attesting Officer*          *Commissioner of Patents and Trademarks*